United States Patent [19]
Wheeler et al.

[11] 3,757,817
[45] Sept. 11, 1973

[54] TANDEM CONTROL VALVE

[75] Inventors: Mildred S. Wheeler, Long Beach; Robert D. Rothi, Rolling Hills, both of Calif.

[73] Assignee: McDonnell Douglas Corporation, Santa Monica, Calif.

[22] Filed: Aug. 23, 1972

[21] Appl. No.: 282,926

Related U.S. Application Data

[62] Division of Ser. No. 148,612, June 1, 1971, Pat. No. 3,726,186.

[52] U.S. Cl. ............................................... 137/596
[51] Int. Cl. ............................................. F16k 11/00
[58] Field of Search ........................... 137/596, 315; 251/366, 231, 279; 91/384, 367

[56] References Cited
UNITED STATES PATENTS

| | | | |
|---|---|---|---|
| 1,675,023 | 6/1928 | Dewandre | 137/596 X |
| 3,702,120 | 11/1972 | Redeker | 137/596 X |
| 3,677,139 | 7/1972 | Wheeler | 81/384 |

*Primary Examiner*—Henry T. Klinksiek
*Assistant Examiner*—Robert J. Miller
*Attorney*—Walter J. Jason et al.

[57] ABSTRACT

A control valve for a hydraulic actuated assembly which includes two valve slides which are resiliently connected in tandem to a control input. If one of the slides jams, the other slide can be moved to cause hydraulic lock of the hydraulic actuator.

3 Claims, 4 Drawing Figures

United States Patent [19]
Wheeler et al.
[11] 3,757,817
[45] Sept. 11, 1973
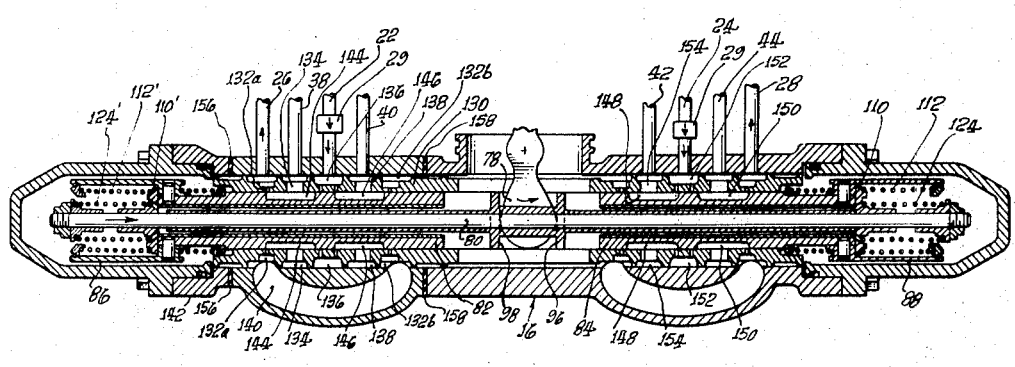

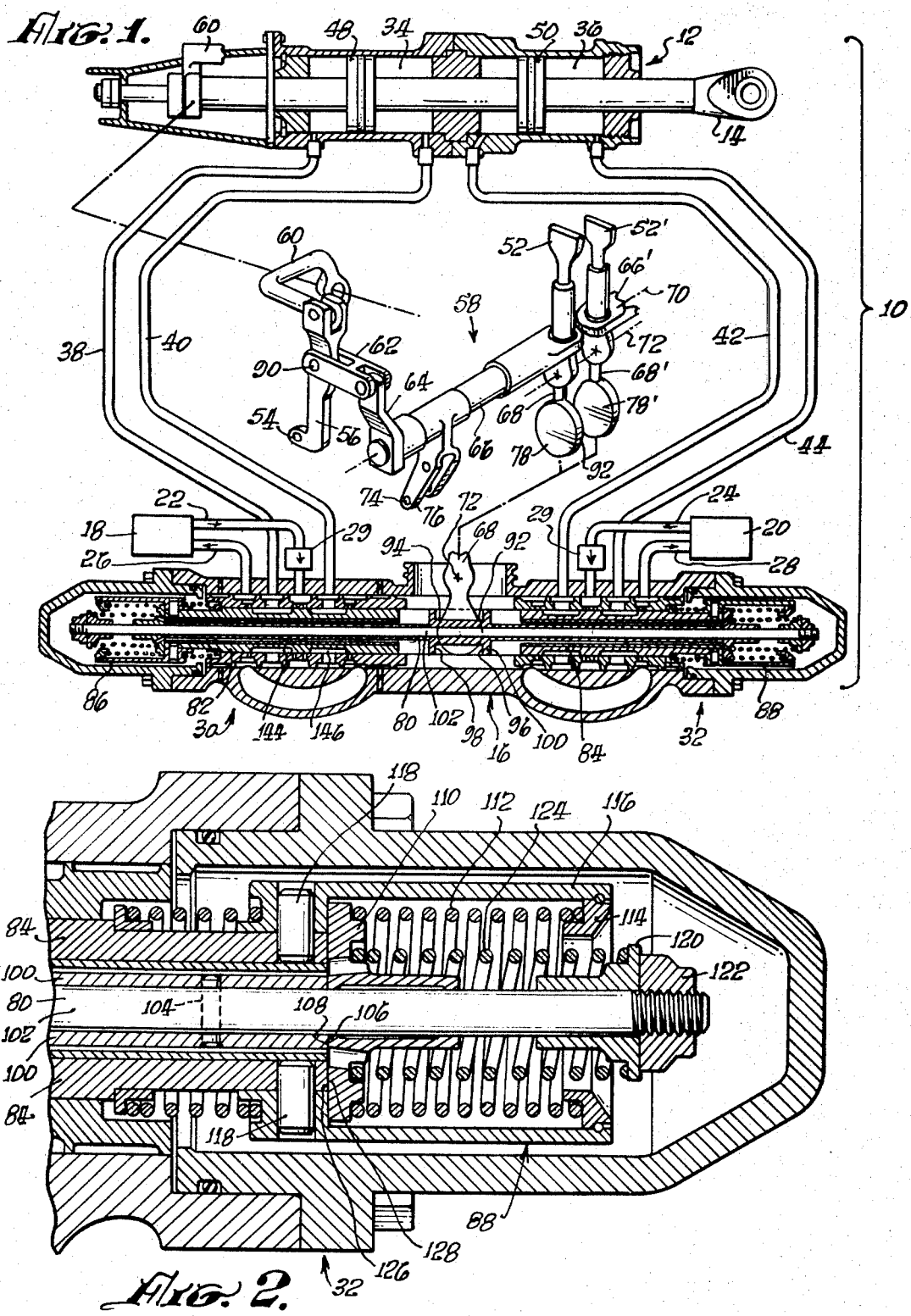

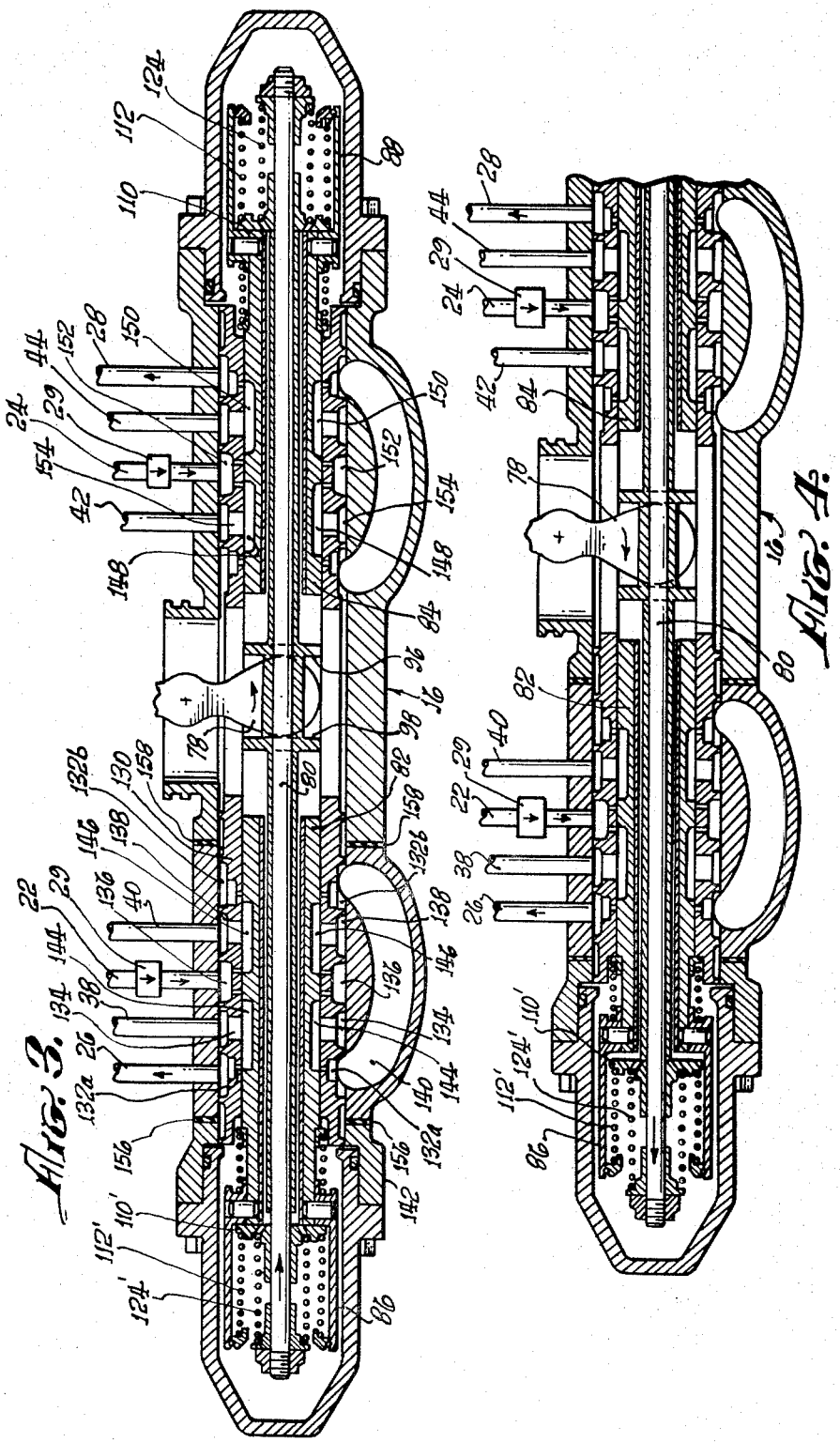

TANDEM CONTROL VALVE

This application is a Division of Application Ser. No. 148,612, filed June 1, 1971, now U.S. Pat. No. 3,726,186.

CROSS REFERENCE TO A RELATED APPLICATION

This application relates to the subject matter of U.S. Pat. Application Ser. No. 54,197, now U.S. Pat. No. 3,677,139, entitled LINE REPLACEABLE UNIT CONTROL VALVE, by Mildred S. Wheeler, which was filed 13 July 1970 and assigned to Applicants' assignee, and reference is made to the information therein as though fully set forth hereinbelow.

BACKGROUND OF THE INVENTION

Modern day aircraft are now of such size and/or fly at such airspeeds that power boost through the use of hydraulic actuator assemblies is required so the pilot is able to move the control surfaces of the aircraft.

Such control surface hydraulic actuator assemblies usually include a hydraulic actuator, a control valve to control the movement of the hydraulic actuator, means which feed commanded inputs to the control valve and means which feedback actuator position data to the control valve so the hydraulic actuator is moved to and positioned in the commanded location. Unfortunately, control valves in some instances have a tendency to jam, that is, the valve spool or slide therein which switches the pressurized hydraulic fluid to one side or the other of the hydraulic actuator to move it, remains in an undesirable fixed position. If unchecked, a spool jammed in a fluid transmitting position causes the hydraulic actuator and the control surface connected thereto to "run away" to one or the other extremes of travel thereof.

Competent aircraft design and federal regulations dictate that unless a control valve jam can be shown to be extremely improbable, a jam must be protected against or the effect thereof alleviated if the jam can cause a flight control surface to run away to an adverse position. Since the jam is probable as aforesaid, three types of prior art valves have been developed to solve the runaway control problem.

One of these prior art control valves has dual concentric slides. Each slide is designed to provide one-half of the required hydraulic flow to the hydraulic actuator and both slides operate in sequence. If a concentric slide jams near neutral, approximately half the flow is available to feed to the hydraulic actuator for control of the control surface. If on the other hand a concentric slide jams hard-over, that is, in a position to port maximum flow to the actuator to move it in one direction, the other valve is moved hard-over in the opposite direction, both actuator cylinder pressures are ported to return and the actuator is in a bypassed condition. Not only is the dual concentric slide valve disadvantageous as causing unnecessary hydraulic flow when jammed in anything but a null position, it can jam near a null position and the jam is not detectable since up to half flow is still available to make the hydraulic actuator operate normally. Since most flight conditions do not require anywhere near the full flow which would cause the dual concentric valve's failure to be obvious, the jam may go undetected until the other slide therein jams and if it jams in the same direction as the first jammed slide, there is a possibility of control surface runaway to a far extreme.

The second prior art valve has a flow controlling slide which operates in conjunction with a caged outer sleeve. When the slide jams, the outer sleeve moves and bypasses the actuator cylinder ports. The third prior art valve has a caged spring cartridge in the valve input drive. When the valve jams, the spring cartridge is overridden, tripping an electrical switch which, as long as electric power is available, energizes a solenoid operated cylinder bypass valve.

In all three prior art control valves, the actuator cylinder is bypassed when a hard-over jam occurs. This is undesirable because the bypass flow wastes hydraulic energy and causes overheating of the hydraulic systems. As should be obvious, the third type control valve which utilizes electric sensing means can lose its jam protection when an electronic failure such as a failed switch or the loss of the electrical system occurs. For this reason the electronic systems must be highly redundant so the requirement of extreme improbability of a runaway flight control surface is met.

SUMMARY OF THE INVENTION

The present tandem control valve has two slides, each one of which control the flow of hydraulic fluid from a separate hydraulic system to separate chambers of similar sizes in the control surface actuator. The valve slides are attached to a driving member through caged spring cartridges and the driving member is driven by the input to the valve. If one of the slides jams and causes more than the commanded actuator movement, actuator position feedback means move the other slide in the direction opposite to the direction in which the jam occurred. Each of the hydraulic systems have the same pressure so moving the non-jammed slide in the opposite direction applies the same force to the actuator as the jammed slide but in the opposite direction to place the actuator in hydraulic lock. The actuator and its connected control surface can never move substantially beyond the commanded position and therefore a control surface runaway cannot occur due to a jammed slide as long as the hydraulic system feeding the non-jammed slide contains fluid. It is extremely improbable that the critical hydraulic system connected to the non-jammed slide will sustain loss of fluid at the same time the other slide jams.

The present control valves are used in aircraft having multiple control surfaces and the operative control surfaces offset the effect of any deflection from the trail position of the inoperative control surface connected to the locked actuator. If the jam occurs early in a flight, leakage around the control valve and the actuator can allow the control surface to assume a more streamline trail position and enable certain limited actuation of the control surface in the direction of the jam during emergencies. An example of this is an elevator control valve jamming on takeoff during rotation where a pitch-up attitude of the aircraft is being commanded and then using that control surface again during the landing flair to again re-establish a pitch-up attitude of the aircraft.

Not only is the present tandem valve safer than the prior art devices, the jam of a slide is detectable even if it occurs near the null position of the valve since the control surface thereafter is locked in position and will not respond to the pilot's commands. If a hard-over jam occurs, the actuator is not in a bypass condition and the control surface stays in the commanded position. There is no overheating of the hydraulic systems since there is no undesirable bypass flow. The present split tandem valve also requires no electronics and therefore no electronic or electrical failure can cause the loss of the jam protection thereof.

It is therefore an object of the present invention to provide a dual control valve which cannot produce runaway of a flight control to an adverse position.

Another object of the present invention is to provide jammed valve protection meeting F.A.A. special conditions for airbuses within the diameter of standard valve configurations.

ANother object is to provide jam protection in a control valve without using electronics and exposed caged spring cartridges.

ANother object is to provide a control valve which can stop a hydraulic actuator runaway by placing the hydraulic actuator in hydraulic lock.

Another object is to provide a control valve having jammed slide protection in which a jam is detectable no matter what the position of the slide when the jam occurs including null and full flow positions.

Another object is to provide a tandem control valve which can be designed as a line replaceable unit so that it can be interchanged on a hydraulic actuator assembly without requiring recalibration of the hydraulic actuator or the connected control system.

Another object is to provide control valve which meets F.A.A. regulations which state "no single failure shall cause the loss of two hydraulic systems".

These and other objects and advantages of the present invention will become apparent after considering the following detailed specification which covers a preferred embodiment thereof in conjunction with the accompanying drawings wherein:

BRIEF DESCRIPTION OF THE DRAWINGS

FIG. 1 is an exploded view of the pertinent parts of a hydraulic actuator assembly showing a dual cylinder hydraulic actuator, a split tandem control valve of the present invention, and the control linkage and flow paths therebetween;

FIG. 2 is an enlarged cross-sectional view of one end of the control valve shown in FIG. 1;

FIG. 3 is a cross-sectional view of the control valve of FIG. 1 shown with one slide thereof jammed in a full flow position and the other slide thereof moved to a position to eliminate runaway of the connected actuator by putting the actuator in hydraulic lock, and FIG. 4 is a cross-sectional view similar to FIG. 3 with the jammed slide jammed in the opposite full flow position.

DESCRIPTION OF THE PRESENT EMBODIMENT

Referring to the drawings, more particularly by reference numbers, number 10 in FIG. 1 refers to a hydraulic actuator assembly for use as a control surface actuator on an aircraft. The assembly 10 includes a dual hydraulic actuator 12 whose output arm 14 provides the driving connection to the aircraft control surface (not shown) to move it. Also, included in the assembly 10 is a split tandem control valve 16 constructed according to the present invention. The control valve 16 controls the flow of hydraulic fluid from one or more hydraulic systems 18 and 20 which supply pressurized fluid thereto through hydraulic lines 22 and 24 and which receive hydraulic fluid therefrom by return lines 26 and 28 respectively. The pressure lines usually include check valves 29 which prevent fluid from returning therethrough.

The control valve 16 has two essentially similar portions 30 and 32 which control the flow of pressurized hydraulic fluid from hydraulic systems 18 and 20 respectively to separate chambers 34 and 36 of the actuator 12. The similar portions 30 and 32 of the control valve 16 usually operate in parallel to provide hydraulic flow through lines 38 and 40 to chamber 34 and through lines 42 and 44 to chamber 36. The chambers 34 and 36 have pistons 48 and 50 respectively therein which are connected to the output arm 14. When the control valve 16 is operating normally, so that both portions 30 and 32 are working in parallel, the control valve 16 causes flow toward the actuator 12 in lines 38 and 42 to extend the output arm 14 and flow toward the actuator 12 in lines 40 and 44 to retract it.

The control valve 16 causes the movement of the actuator output arm 14 in response to input commands fed to the assembly 10 either through autopilot inputs which move member 52 or by means of manual inputs applied to one end 54 of a link 56 which is part of linkage means 58 mechanically interconnecting the various components of the assembly 10. The link 56 connects the manual inputs and the position of the arm 14 connected thereto by an arm 60, to the control valve 16 by means of another link 62, a crank 64, a shaft 66, and a summing link 68. The axis of rotation 70 of the shaft 66 as shown is above an axis 72 at which the summing link 68 is pivotally connected to the shaft 66. In some applications where redundant linkage is required, the linkage means 58 include redundant components. This redundancy is partially shown in FIG. 1 with the redundant components identified with the same numbers and a prime (').

When autopilot inputs control the assembly 10, the autopilot moves the member 52 which is formed on the upper end of the summing link 68. During autopilot operation, means applied at the end 74 of an arm 76 connected to the shaft 66 restrain rotation of the shaft 66. This causes the movement of the member 52 to move the summing link's lower end 78 which extends down into the control valve 16 to move the input shaft 80 thereof. The input shaft 80 is connected to flow controlling valve slides 82 and 84 in the valve 16 through spring cages 86 and 88 respectively. Therefore, movement of the input shaft 80 normally causes corresponding movement of the slides 82 and 84 which allow flow of hydraulic fluid to the hydraulic actuator 12. In response to the flow of hydraulic fluid, the output arm 14 of the hydraulic actuator 12 moves the connected control surface in the commanded direction. The output arm 14 also moves the arm 60 which feeds the position thereof back through the link 56 which rotates about a pivot 90 connecting the link 56 to link 62 to thereby reposition the end 54 and the manual control system (not shown) connected thereto in correspondence to the new position of the control surface.

When manual inputs are used to control the assembly 10, the arm 76 is released so the shaft 66 can rotate about the axis 70. At the same time the member 52 is fixed in a centered position by the autopilot. Manual inputs applied to the end 54 of the link 56 thereafter cause rotation of the shaft 66 about the axis 70 to reposition the axis 72. Since the upper end member 52 of the summing link 68 is fixed, the lower end 78 thereof is moved in proportion to the movement of the axis 72 to move the input shaft 80 and the spring cage connected slides 82 and 84 of the control valve 16. The slides 82 and 84 then allow flow of hydraulic fluid to the actuator 12 which moves the output arm 14 thereof and the connected control surface. The new position of the output arm 14 is fed back through to the arm 60, the link 62, the crank 64, and the shaft 66 to reposition the axis 72 so the lower end 78 of the summing link 68 repositions the input shaft 80 of the control valve to its centered position. This nulls the slides 82 and 84 and reduces the flow of hydraulic fluid to zero, ceasing motion of the output arm 14 and the control surface in the position commanded.

The mechanical inputs are fed to the control valve 16 by the lower end 78 of the summing link 68 as aforesaid. The lower end 78 is shown as a spoon shaped member whose opposite sides 92 and 94 fit between parallel abutment surfaces 96 and 98 on an input sleeve 100 which along with an input rod 102 form the input shaft 80 of the control valve 16. The sleeve 100 and the rod 102 are fixed together by means such as the pin 104 shown in FIG. 2 so they move in unison.

Looking at FIG. 2 which is an enlarged view of the right side portion 32 of the control valve 16, it can be seen how motion of the input shaft 80 is transferred to the valve slide 84. For example, if the shaft 80 is moved to the right, the end 106 of the sleeve 100 bears against an abutment surface 108 on a collar 110 which is mounted for sliding movement on the input rod 102 and which forms one end portion of the cage 88. The movement of the collar 110 is transferred by a compressed spring 112 to a ring member 114 which is fixedly attached to the slide 84 by means such as sleeve 116 and pins 118. As long as the slide 84 is not jammed and is free to move within the control valve 16, the spring 112 merely transfers rightward motion of the input shaft 80 to move the slide 84 a corresponding distance to the right. If however, the slide 84 is jammed so that it is not free to move within the valve 16, the spring 112 further compresses so that the jammed slide 84 does not restrict the rightward motion of the input shaft 80.

When the input shaft 80 is moved to the left, a collar 120 attached to the end of the input rod 102 by a nut 122 bears against a second compressed spring 124 to transfer the leftward motion to the collar 110. The collar 110 includes an abutment surface 126 which contacts an opposed abutment surface 128 on the slide 84 so that leftward movement of the shaft 80 is transferred through the rod 102, the collar 120, the spring 124 and the collar 110 to move the slide 84 to the left so long as the slide 84 is free to move. If the slide 84 is jammed within the control valve 16 however, the spring 124 is further compressed to effectively disconnect the slide 84 from the shaft 80 and thereby prohibit the transference of the jammed condition to the input shaft 80.

The spring cage 86 which is shown positioned on the opposite end of the input shaft 80 is essentially identical to the spring cage 88 and it operates in a like manner to prevent the transference of a jammed condition of the slide 82 to the input shaft 80. The prevention of jam transference is essential to the operation of the control valve 16 since the input shaft 80 must be able to move the unjammed valve slide or there is a possibility of actuator runaway.

The operation of the control valve 16 when the slide 82 is jammed hard-over to the left is shown in FIG. 3 and a jam thereof hard-over to the right is shown in FIG. 4. The slide 82 is normally free to move within a sleeve 130 in which valve ports 132a and 132b, 134, 136 and 138 are located. The return ports 132a and 132b are connected by a passageway 140 in the valve housing 142 and are connected to line 26 while the pressure ports 136 are connected to the pressure line 22. When the control valve 16 is in its null position shown in FIG. 1, passageway 144 and 146 formed in the slide 82 permit no hydraulic flow through the lines. However, when the slide 82 is moved leftward up to the hard-over position shown in FIG. 3, pressurized fluid is ducted from the pressure line 22 through the ports 136, the passageway 146, the ports 138, and the line 40 to the right side of the chamber 34. The pressurized fluid pushes on the right side of the piston 48 to retract the output arm 14. At the same time the passageway 144 opens a flow channel between lines 26 and 38 through ports 132a and 134 respectively so that fluid from the left side of the chamber 34 can return to the hydraulic system 18.

Normally, the position of the output arm 14 is transferred through the linkage means 58 to move the slide 82 back to its null position when the output arm 14 has reached the commanded position. However, when the slide 82 jams to the left, the position feedback cannot return the slide 82 to its null position and therefore the actuator output arm 14 moves slightly beyond the commanded position. When this happens, the end 78 of the summing link 68 moves the input shaft 80 to the right past the null position. As aforesaid, the spring cartridge 86 enables the input shaft 80 to move to the right even through the slide 82 is jammed. The movement of the input shaft 80 to the right of its null position causes the slide 84 to move to a position wherein its passageways 148 and 150 allow flow of pressurized fluid from line 24 through ports 152 to line 42 by way of ports 154. The line 42 supplies pressurized fluid to the left side of the piston 50 in the chamber 36 which would normally cause the output arm 14 to move to the right. However, the pressure of hydraulic fluid supplied by the hydraulic systems 18 and 20 is essentially the same and since the pistons 48 and 50 are normally of equal area, the action of the slide 84 in opposition to the slide 82 puts the actuator 12 in hydraulic lock so that its output arm 14 can move no further leftward away from the commanded position.

The valve 16 prevents an abrupt runaway of the actuator 12 even in the event the hydraulic system connected to the nonjammed slide is inoperative so long as fluid is present in the failed hydraulic system. Referring to the foregoing example, the check valve 29 will prevent the fluid, which must be vented to allow the output arm 14 to further retract, from returning to the failed system 20. This means that only lap leakage around the slide 84 and perhaps a very small leakage through the check valve 29 will enable the output arm 14 to further retract. This leakage occurs at a very slow rate so only on a long flight where the jam and failure occur on takeoff does the control surface ever have a chance of going "hard over". The time to "hard over" is more than sufficient to enable the pilot to make a safe precautionary landing.

When the slide 82 jams to the right up to the hardover position shown in FIG. 4, the actuator 12 is again thrown into hydraulic lock to prevent runaway thereof. With the slide 82 jammed in the hard-over right position shown in FIG. 4, pressure is applied to the left side of the piston 48 which drives the output arm 14 to the right. Like before however, as soon as the output arm 14 has extended further than the commanded position, the linkage means 58 move the input shaft 80 of the control valve 16 past the null position and to the left where the slide 84 allows the flow of pressurized fluid from the pressure line 24 to the line 44 which feeds pressure to the right side of the piston 50 in chamber 36 to restrain the output arm 14 from further rightward or extending movement and to put the actuator 12 in hydraulic lock.

In both the jam cases shown in FIG. 3 and in FIG. 4 it can be seen that the spring cage 86 adjacent to the jammed slide 82 has effectively released the slide 82 from the input shaft 80 so the shaft 80 is able to move the free slide 84 to lock the actuator 12. When the slide 84 jams, the spring cage 88 performs the same function and allows the shaft 80 to move the slide 82 to lock the actuator 12.

The third jam case which should be mentioned is where one of the slides 82 or 84 jams in its null position. If this happens no fluid can flow in or out of the chamber 34 or 36 by the jammed slide and the actuator 12 is again effectively placed in hydraulic lock. More importantly, when a slide jams at its null position, the present invention makes the jam detectable by ceasing all movement of the connected control surface. Means are usually provided in the cockpit to signal this cessation of movement to the pilot since he can not always see the control surface directly.

It should be realized that although the control valve 16 shown is a split tandem control valve, that is, a slide is connected on the opposite ends of the input shaft 80, the teachings of the invention can be used to provide control valves having adjacent slides and inputs at one or both ends. Of course, these latter designs may have disadvantages when it comes to protecting the control valve 16 against complete failure due to a failure of the housing 142 thereof. Failure of the housing 142 in the shown embodiment is guarded against by making the housing 142 in three portions which are connected by "rip stop" means 156 and 158. Such means are usually brazed portions which prevent cracks or tears in the housing 142 from propagating therethrough so that a small crack in one portion of the housing 142 cannot rip the complete valve open and cause catastrophic failure thereof.

Thus, there has been shown and described novel control valves which fulfill all the objects and advantages sought therefore including, providing jam protection to hydraulic actuator assemblies. Many changes, alterations, modifications and other uses and applications of the subject control valves will become apparent to those skilled in the art after considering this specification and the accompanying drawings. All changes, alterations, and modifications which do not depart from the spirit and scope of the invention are deemed to be covered by the invention which is limited only by the claims which follow.

What is claimed is:

1. A control valve including:
    a housing having a first and second set of valve ports therein;
    a first switching member adapted to move in said housing to control communication through said first set of ports;
    a second switching member adapted to move in said housing to control communication through said second set of ports;
    first preloaded resilient means connected to said first switching member;
    second preloaded resilient means connected to said second switching member; and
    input means connected to said first and second preloaded resilient means to releasably feed input motion to said first and second switching members.

2. The control valve defined in claim 1 wherein:
    said input means are between said first and second switching members so that a failure associated with one of said switching members is not likely to cause the failure of said other switching member.

3. The control valve defined in claim 1 wherein:
    said first and second switching members are sleeve members adapted to slide along an axis within said housing; and
    said input means include an input shaft which extends along the housing axis through said sleeve members and is connected to said first and second preloaded resilient means to feed input motion therethrough to said sleeve members.

* * * * *